Figure 1:
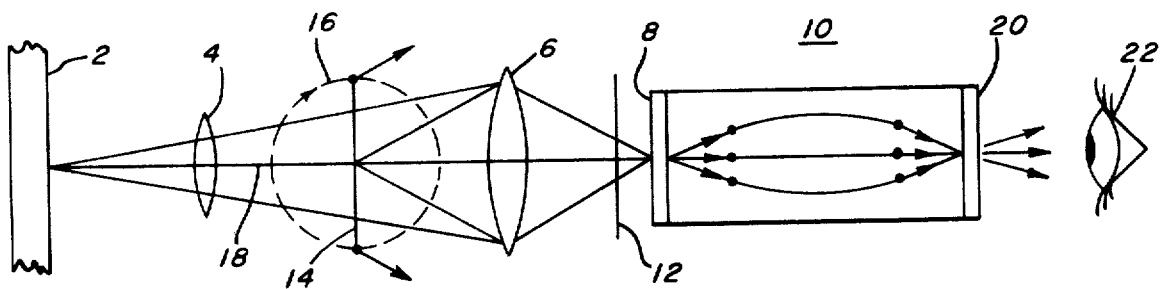

United States Patent
Murray

[11] 3,880,522
[45] Apr. 29, 1975

[54] LOW TEMPERATURE DISAPPEARING FILAMENT OPTICAL PYROMETER

[75] Inventor: Thomas P. Murray, Pittsburgh, Pa.

[73] Assignee: United States Steel Corporation, Pittsburgh, Pa.

[22] Filed: Sept. 5, 1973

[21] Appl. No.: 394,605

[52] U.S. Cl................. 356/46; 73/355 R; 250/333; 356/49; 356/51
[51] Int. Cl............................ G01j 5/52; G01j 5/54
[58] Field of Search............ 356/43, 46, 47, 48, 49, 356/50, 51; 73/355 R; 250/330, 331, 332, 333, 213 R, 213 VT

[56] References Cited
UNITED STATES PATENTS
2,252,015  8/1941  Machler.............................. 356/50
3,752,983  8/1973  Yanez................................ 250/333

Primary Examiner—Vincent P. McGraw
Attorney, Agent, or Firm—Rea C. Helm

[57] ABSTRACT

An optical pyrometer focuses radiant energy images from a hot object and a measuring wire on the receiving screen of an image converter. The temperature, which can be as low as 1000°F, is then determined by brightness match of visual images on the viewing screen of the image converter.

5 Claims, 2 Drawing Figures

PATENTED APR 29 1975  3,880,522

LOW TEMPERATURE DISAPPEARING FILAMENT OPTICAL PYROMETER

This invention relates to temperature measurement and more particularly to temperature measurement with a disappearing filament optical pyrometer at temperatures where the visual brightness of the images is too low for the eye to make the necessary brightness match.

In a disappearing filament optical pyrometer, the image of the hot target is focused on the plane of a wire which can be heated to temperatures such that the brightness of the wire equals that of the target. This condition occurs when the wire can no longer be visually distinguished against the image of the target. By calibrating the rheostat used to vary the heating current passing through the wire, the brightness temperature of the target can be determined.

This type pyrometer is recognized as one of the most precise and dependable instruments available for the measurement of temperature by means of radiation. Since these instruments are not automatic and therefor require an operator, they are not suited for direct control of a process. Because of the relative simplicity, reliability and portability of the optical pyrometer the device is useful as a temperature standard and other automatic temperature measuring instruments are adjusted to agree with the optical pyrometer. However, below about 1400°F the target as seen through the optical pyrometer is not bright enough to permit reliable readings to be made.

In accordance with my invention, the radiant energy images of the hot object and the measuring wire of an optical type pyrometer are focused on the receiving screen of an image converter. The image converter electronically converts the image focused on the receiving screen to a visual image on the viewing screen of the image converter. The visual images on the viewing screen of the image converter are then adjusted in the same manner as the conventional optical pyrometer to provide temperature measurements as low as 1000°F.

It is therefore an object of my invention to provide a disappearing filament type optical pyrometer that measures temperatures as low as 1000°F.

Another object of my invention is to provide an optical pyrometer that converts radiant energy images of a hot object and a filament into visible images on a screen.

These and other objects will become more apparent after referring to the following specification and drawings in which FIG. 1 is a schematic diagram of the essential features of my invention.

Figure 2:
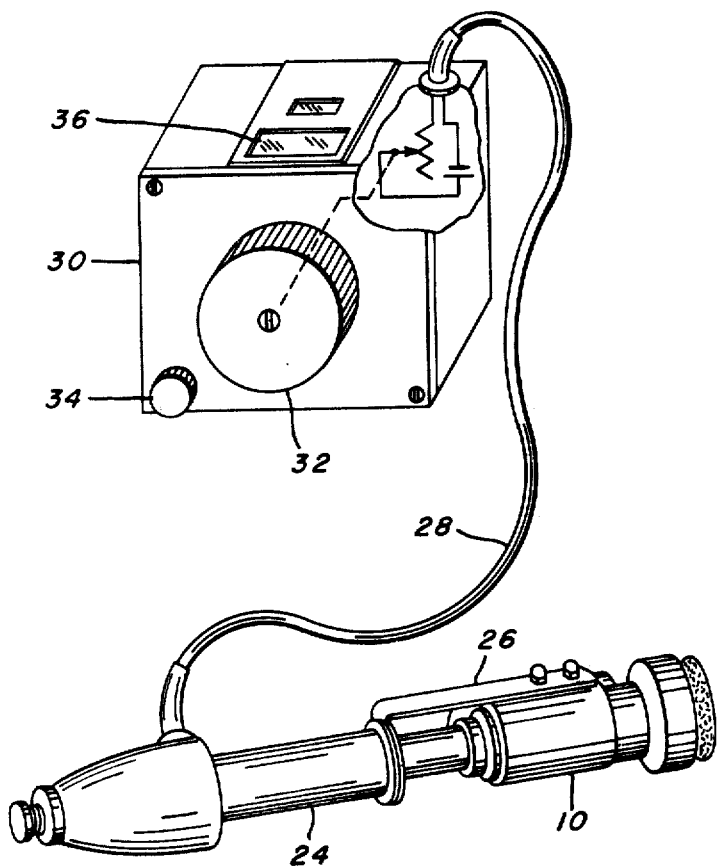

FIG. 2 is a perspective sketch of the low temperature optical pyrometer.

Referring now to FIG. 1 of the drawing, reference numeral 2 indicates a hot object the temperature of which is to be determined. An optical system shown diagrammatically as lenses 4 and 6 focuses a radiant energy image of the hot object onto a photo cathode receiving screen 8 of an image converter shown generally at 10. A filter 12 is placed between lens 6 and screen 8. A wire 14 is heated by the resistance to flow of an electric current through it and mounted for rotation 16 about the optical axis 18, is placed so that the radiant energy image of the wire is focused on screen 8. Image converter 10 has a viewing screen 20 for visual observation 22 of the radiant energy images received on screen 8.

FIG. 2 illustrates an actual instrument in which the image converter 10 is attached to an optical pyrometer 24 by a bracket 26. The optical pyrometer may be a conventional instrument such as a Leeds & Northrup Type 8630 Series and includes a control lead 28 and a control box 30 having a control knob 32 operating the rheostat in a battery circuit supplying current from a battery to heat wire 14. Control box 30 also has a calibrating knob 34 for temperature indicating dial 36. Image converter 10, sometimes also called an image intensifier, may be a Model 5500 Infra Red Viewer manufactured by Varo, Inc., Electronic Products Division, Garland, Texas.

In reading temperatures below 1400°F with a low temperature disappearing filament optical pyrometer, the image of the hot object 2 is formed on screen 8 by the lens system. The radiation from the hot object 2 striking screen 8 causes the screen to emit electrons. The electrons are then focused by an electrostatic field inside image converter 10 so that they strike the receiving screen 20 in a pattern which is an exact image of the radiation pattern from the hot object 2. Viewing screen 20 is phosphorescent so that, when struck by the electrons, it gives off light. An observer, 22, looking at screen 20 then sees a visual image of the pattern which was formed on screen 8 by the radiation, the brightness varying with the intensity of the radiation received by screen 8. In the same manner radiation from wire 14 is focused on screen 8 and visually displayed on screen 20. As in a conventional pyrometer, a brightness match is made by adjusting the temperature of wire 14. The patterns on screen 20 may be formed by infrared radiation which is not visible to the eye, but the pattern on screen 20 emits radiation in the visible region.

The pyrometer may be calibrated by sighting the unit on a blackbody at a known temperature, making a brightness match of wire and target and marking the measuring scale 36 with the appropriate temperature.

While the pyrometer is capable of providing accurate results, a failure to correct the reading for emittance of the target may result in erroneous readings. It is most important, for example in measuring the temperature of steel to correct for oxidized steel, or unoxidized steel as the case may be. In addition, if for example, a reading is made in a furnace, care must be exercised to eliminate the effect of furnace reflections by the use of a sight tube. Care must also be exercised to shield the target so as to eliminate any reflections from sunlight or incandescent light.

Filter 12 is useful in restricting the wave length response of screen 8 and thus contribute towards making the instrument repeatable. The filter should be in the range of the peak spectral response of screen 8.

By rotating wire 14 to different positions and taking several temperature measurements, differences in images are eliminated.

The particular image intensifier used has a peak spectral response in the infrared region, but other parts of the spectrum may be used providing the energy is in that part of the spectrum and the receiver is sensitive to it.

While one embodiment of my invention has been shown and described, it will be apparent that other modifications may be made.

I claim:

1. A low temperature disappearing filament optical pyrometer for measuring the temperature of a hot object comprising
   an image converter having a receiving screen for receiving a radiant energy image of a hot object,
   said converter having a viewing screen for displaying visually the image received on the receiving screen with a brightness varying with the intensity of the radiation received,
   a wire heated by passage of an electric current through the wire,
   an optical system for focusing the radiant energy image of the hot object whose temperature is to be measured and the heated wire on the receiving screen, and
   means for varying the current through the wire thereby varying the brightness of its visual image on the viewing screen.

2. A pyrometer according to claim 1 in which the image converter has a peak spectral response in the infrared region.

3. A pyrometer according to claim 2 which includes a filter in the optical system for passing a narrow band of radiant energy including said peak spectral response from the hot object and the wire to the receiving screen.

4. A pyrometer according to claim 3 which includes means for rotating said wire.

5. A pyrometer according to claim 1 which includes means for rotating said wire.

* * * * *